United States Patent
Hagerty

[15] 3,683,548
[45] Aug. 15, 1972

[54] PLANT CONTAINER AND METHOD OF GROWING A PLANT THEREIN

[72] Inventor: Robert F. Hagerty, 10½ Legare St., Charleston, S.C. 29401

[22] Filed: Feb. 22, 1971

[21] Appl. No.: 117,458

[52] U.S. Cl. ............................................. 47/38.1
[51] Int. Cl. ......................................... A01g 27/00
[58] Field of Search .................. 47/1.2, 38–38.1, 47/34

[56] References Cited

UNITED STATES PATENTS

| | | | |
|---|---|---|---|
| 1,995,217 | 3/1935 | Nelson | 47/38.1 |
| 2,089,220 | 8/1937 | Norman | 47/38.1 |
| 2,249,197 | 7/1941 | Brundin | 47/1.2 |

FOREIGN PATENTS OR APPLICATIONS

| 1,098,155 | 1/1968 | Great Britain | 47/38.1 |

Primary Examiner—Robert E. Bagwill
Attorney—Beveridge & De Grandi

[57] ABSTRACT

A plant container and a method of growing plants utilizing the same wherein vertical and horizontal partitions are placed in a container to accommodate two different types of soil or plant growing media, one being a coarse medium located at the bottom of the container below the horizontal partition and above the horizontal partition to one side of the vertical partition; and the other being a fine medium located above the horizontal partition to the other side of the vertical partition. A wick is placed in the container to extend from the coarse medium at the container bottom upwardly through the horizontal partition into the fine medium for delivering moisture thereto. The coarse medium is primarily used for transmitting water and oxygen to the roots while the fine medium is employed to impart nutrients such as minerals to the plant. Water is initially introduced into the container only through the coarse medium and is transmitted to the fine medium through the wick. In placing the plant in the container, the roots in the plant are divided on opposite sides of the vertical partition so that a portion of the roots grow in the coarse medium and another portion in the fine medium.

11 Claims, 4 Drawing Figures

Patented Aug. 15, 1972

3,683,548

INVENTOR
ROBERT F. HAGERTY

BY Beveridge & De Grandi

ATTORNEYS

PLANT CONTAINER AND METHOD OF GROWING A PLANT THEREIN

BACKGROUND OF INVENTION

Two main functions of soil in plant growth are to provide support and nutrition to the plant. The nutritional elements which a plant must obtain in order to grow properly are of course minerals, water, and oxygen. The plant growing medium can be selected so as to provide the proper nutrients and also to impart to the plant particular characteristics, such as a specific pH, to provide an ideal environment for the roots of the plant to assimilate the necessary minerals. Various plant growing mediums can thus be designed for the specific demands of a plant or plants, each having its own specialized use and advantage.

Despite the aforementioned well-known factors in growing plants, there has persisted two serious problems in the growing of plants. One problem is the "drowning" of the root system with too much water which causes air to be displaced from the plant growing medium with the result that the root system is unable to take up oxygen. The other problem results from the increasing concentration of salts associated with repeated applications of fertilizer to the growing medium. As a result of the latter, the ability of the root system to take on nutrients from the plant growing medium becomes increasingly difficult and ultimately seriously impaired.

OBJECTS OF INVENTION

One of the objects of the present invention is to provide a novel plant container and a novel method of growing a plant therein which ensure that the necessary amount of water and oxygen will be supplied to the plant and yet at the same time permit a choice of a desired soil or plant growing medium to provide the necessary nutrition or other desirable characteristics to the plant.

A further object of the present invention is to provide such a container and method which guard against under-watering the plant as well as over-watering the plant. Included herein is the provision of such a container and method which permit proper watering of the plant without leaching out the minerals in the plant growing medium.

A further object of the present invention is to provide such a container and method which will permit easy and proper care of a plant by the non-professional horticulturist without involving any extra supervision or appreciable expense.

Yet another object of the present invention is to provide such a container and method which may be employed to significantly increase the rate of plant growth while eliminating difficulties resulting from diseases such as those attributed to fungus infections.

SUMMARY OF INVENTION

In accordance with one embodiment of the invention, the above and other objects are achieved starting with a standard plant container and providing a hole in the side wall thereof approximately 1 inch from the bottom. A wick is then placed on the bottom of the container which is then filled to approximately 2 inches with a coarse plant growing medium whose particles may have a maximum diameter of three-eighth to one-half of an inch. A vertical partition which may be a piece of thin sheet material made from aluminum, is then placed vertically in the container to divide it in approximately two compartments. The wick is then brought up on one side of the vertical partition to lie approximately in the center of one compartment on said one side of the partition. A horizontal partition in the form of a screen or sheet, is then placed horizontally in the container in said one compartment with the wick penetrating through and above this horizontal partition. Said one compartment is then filled with a fine plant growing medium to suit the mineral and other needs of the particular plant. The other compartment on the opposite side of the vertical partition is then filled with the coarse plant growing material.

In introducing the plant into the container, the plant is situated athwart the upper edge of the vertical partition with the roots thereof introduced into both plant growing mediums on opposite sides of the vertical partition. Water is introduced only through the coarse plant growing medium and until it runs out through the drainage hole at the bottom of the container. A reservoir is thus contained in the bottom of the container providing a steady supply of water to the wick which transmits the water into the fine plant growing medium.

In another embodiment of the invention, the vertical and horizontal partitions are fixed to or formed integral with each other to form one piece which may be easily introduced or removed from the container.

Other objects and advantages of the present invention will become apparent from the following more detailed description taken in conjunction with the attached drawings in which.

DETAILED DESCRIPTION

Figure 1:
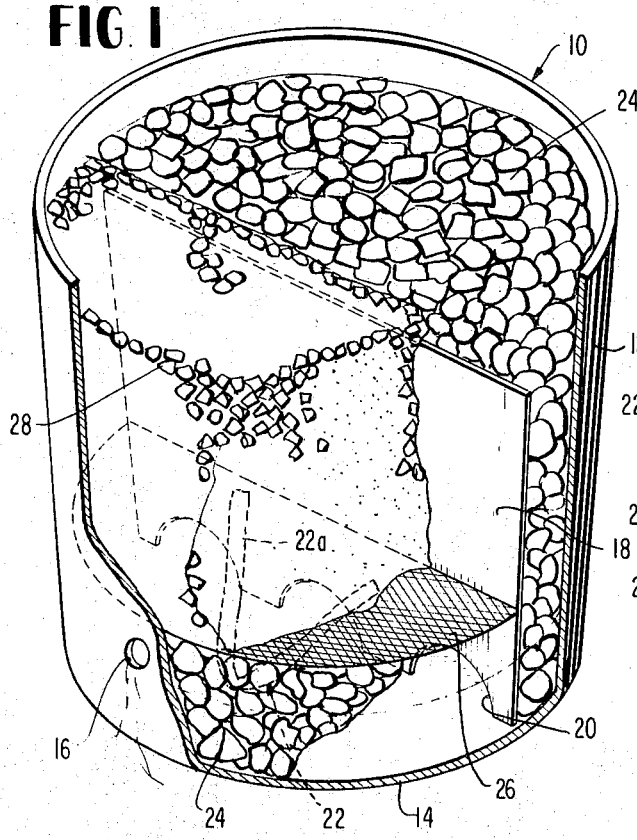
FIG. 1 is a perspective view of a container including horizontal and vertical partitions and two different plant growing mediums in accordance with the present invention and with a portion of the side wall of the container being broken away to show internal features.

Referring now to the drawings in detail, FIG. 1 shows for illustration purposes only, a container generally designated 10 equipped with a partitioning system and a plurality of plant growing media in accordance with the present invention. Container 10 may have any conventional external configuration such as a cylindrical or slightly conical side wall 12 upstanding from a horizontal bottom wall 14 and terminating in an open top. Any suitable material such as plastic, wood or metal may be employed in forming the container. Side wall 12 is provided with an aperture 16 at a bottom portion thereof approximately 1 inch from bottom wall 17 for purposes of permitting excess water to drain from the container as will be subsequently described.

The interior of the container is divided into generally two more or less equal sections or compartments by means of a vertical partition 18 which is made from a sheet material such as aluminum steel, plastic or any other suitable material. Partition 18 is sufficiently dimensioned to extend fully across the container to opposite side wall portions thereof and to extend from bottom wall 14 to almost to the top of the container as shown in FIG. 1. Although only one vertical partition is used in the shown embodiment, a plurality of vertical partitions forming more than two compartments may be employed in other embodiments depending on the type and number of plants to be grown in the container as well as the size of the latter.

Figure 2:
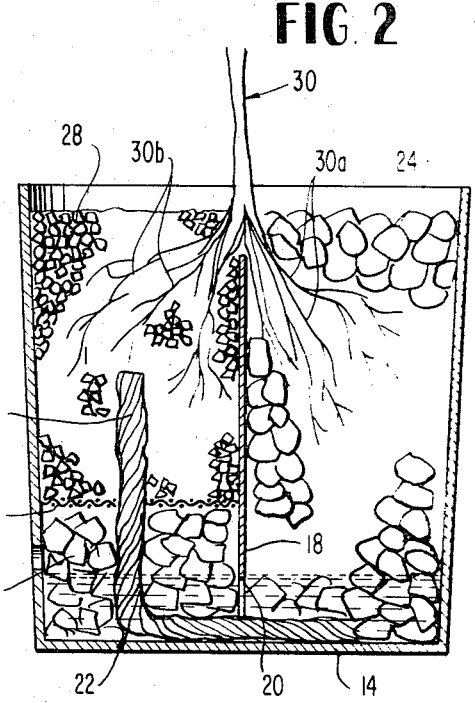
FIG. 2 is a cross-sectional view of the container shown in FIG. 1 also including the roots of a plant.

The lower edge of partition 18 is formed with a series of cut-out portions 20 shown as semi-circular in shape to accommodate a wick 22, a portion of which is placed along the bottom wall 14 of the container to extend from one side of partition 18 and then upwardly at 22a into the center of the compartment on the left-hand side of the container as viewed in FIGS. 1 and 2. The right-hand side of the container, that is, the compartment on the right-hand side of vertical partition 18, is then filled with a coarse plant growing medium which for example in growing tomato plants or geraniums may have a maximum particle size of three-eighth to one-half of an inch in diameter.

The left-hand side compartment of the container (lying on the left of vertical partition 18 as viewed in FIG. 2) is then divided into upper and lower sub-compartments by a horizontal foraminous partition shown as being in the form of a screen 26 having a relatively coarse mesh or sheet. Horizontal partition 26 is located closer to the bottom wall 14 of the container than the top of the container, and prior to placement of screen 26, the sub-compartment below screen 26 (at the bottom left-hand side of vertical partition 18) is filled with the coarse growing medium 24 as illustrated in the drawings. The end portion 22a of wick 22 is then passed vertically through horizontal partition 26 so that it extends upwardly into the sub-compartment above screen 26. The latter sub-compartment is then filled with a fine plant growing medium which may be selected to suit the particular plant. In growing tomato plants or geraniums for example, the fine growing medium 28 may contain peat, vermiculite, and perlite. It will be understood that for growing other plants, any other suitable growing medium 28 may be selected to suit the particular plant. It will also be understood that any suitable coarse growing medium 24 may be employed either in the form of soil or synthetic matter or a combination of both which will provide plant support while permitting water to permeate downwardly to the bottom of the container from which wick 22 will transmit the same upwardly into the fine growing medium 28.

After the container is prepared as described above, the plant 30 may then be introduced and in doing so, the stem of the plant is placed above the vertical partition 18 as shown in FIG. 2. Additionally, and importantly, a portion of the roots 30a is placed to one side of vertical partition 18 so as to grow into coarse medium 24 and the remaining portion 30b of the roots is placed to the left of vertical partition 18 so as to grow into the finer growing medium 28. In watering the plant, water is introduced only into the right-hand compartment of the container (as viewed in FIG. 2) to permeate downwardly through the coarse medium 24. When the water begins to exit from drainage port 16 near the bottom of the container side wall 12, introduction of the water is stopped, leaving a reservoir of water in the bottom of the container below port 16. Water will be transmitted by wick 22 upwardly into the finer plant growing medium 28 to be taken by the roots 30b in that section of the container.

Figure 3:
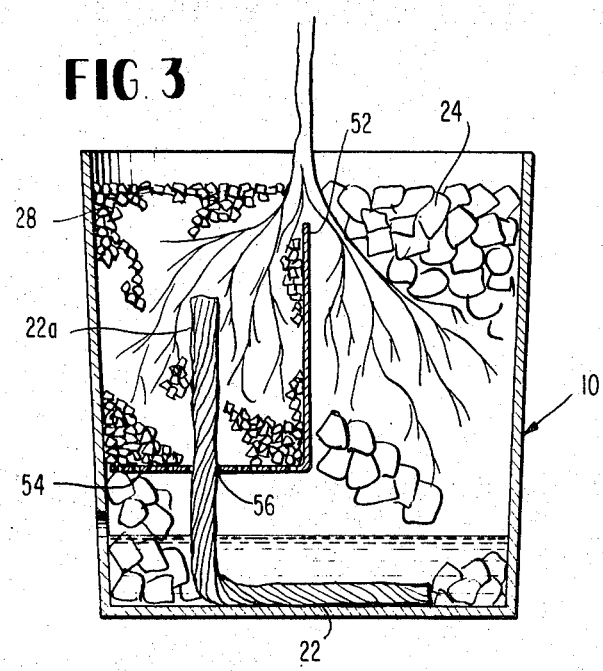
FIG. 3 is a view similar to FIG. 2 but disclosing a modified form of vertical and horizontal partitioning in the container.
Figure 4:
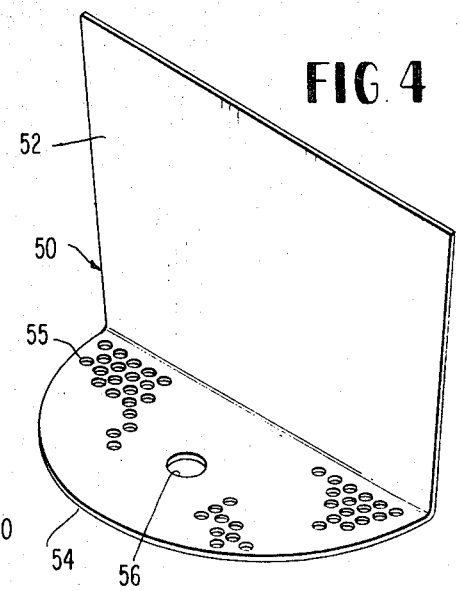
FIG. 4 is a perspective view of the partition element included in the container of FIG. 3.

Although in the embodiment disclosed in FIGS. 1 and 2 described above, the vertical and horizontal partitions 18 and 26 are formed by two separate pieces, the partitioning may be provided by a one piece structure such as 50 shown in FIGS. 3 and 4. Partition 50 may include a flat non-apertured or solid vertical portion 52 of sufficient size to extend entirely across the associated container 10. Projecting laterally at right angles from the bottom of portion 52 is a horizontal partition portion 54 having a generally semi-circular shape to conform to the cylindrical side wall of container 10. Horizontal portion 54 may be a sheet or provided with a plurality of apertures so that the entire surface of partition 55 is apertured. Additionally, a large aperture 56 is provided in the center of partition portion 54 to accommodate wick 22 as shown in FIG. 3. Partition element 50 may be made from any suitable metallic material such as sheet steel or aluminum any may also be molded or otherwise formed from a plastic material. Partition 50 is used generally in the same manner described above in connection with the embodiment shown in FIGS. 1 and 2. Additionally, it will be noted that partition element 50 is removable from the container and subsequently reuseable.

In addition to the advantages enumerated above, it will thus be seen that with the present invention, watering of the plant does not leach out minerals in the fine plant growing medium and yet if desired, the medium containing the minerals can be leached by over-watering since the other set of roots in the coarse medium will still absorb the necessary oxygen. Also, various distinct media can be devised to suit special needs such as pH, temperature, aertion, water content,etc., as well as to avoid interference with availability of minerals.

Although certain embodiments have been shown and described above, the scope of the present invention is indicated in the appended claims.

What is claimed is:

1. A plant growing container comprising a bottom wall and a side wall upstanding from the bottom wall to define a compartment having an open top for receiving a plant growing medium, first vertical partition means located in the container to divide the same into at least two compartments located on opposite sides of said first partition means, the upper end of said vertical partition means being spaced below the upper end of said side wall a distance sufficient to permit placement of plant roots above and on each side of said vertical partition means, second partition means located in a section of the container including one of said compartments to divide the sections into two upper and lower sub-compartments located on opposite sides of said second partition means, a first relatively coarse growing medium located in the other of said compartments, a second relatively fine growing medium located in said upper sub-compartment, said coarse growing medium extending into the lower sub-compartment, and wick means extending from said other compartment through said second partition means and into said upper sub-compartment for transmitting water introduced into said container through said coarse medium to said fine medium.

2. The container defined in claim 1 wherein said side wall has a drainage aperture therein adjacent said bottom wall and below said upper sub-compartment for draining excess water from the container.

3. The container defined in claim 2 wherein said first partition means includes a vertical substantially non-apertured sheet extending fully across said container and located so as to divide the container into generally two more or less equal compartments, and wherein said second partition means extends horizontally and is apertured substantially throughout and has an outer peripheral edge conforming to and engaging the side wall of the container.

4. The container defined in claim 3 wherein said vertical and horizontal partition means are formed by separate pieces.

5. The container defined in claim 3 wherein said vertical and horizontal partition means are formed in one piece.

6. The container defined in claim 3 wherein said horizontal partition means is an apertured sheet or screen.

7. The container defined in claim 3 wherein the particle size of the coarse medium has a particle size with a maximum dimension of three-eighths to one-half an inch in diameter.

8. The container defined in claim 7 wherein said fine medium includes peat, vermiculite and perlite.

9. The container defined in claim 3 wherein said sheet extends generally to said bottom wall and has a plurality of apertures in its lower edge for accommodating said wick means.

10. The container defined in claim 9 wherein said wick extends horizontally along said bottom wall of said container and then vertically upwardly into said upper sub-compartment through said horizontal partition means.

11. A method of growing a plant in a container comprising the steps of dividing the container in at least two compartments, placing a relatively coarse growing medium in one compartment and a relatively fine growing medium in the other compartment, introducing a plant by locating the stem of the plant generally at the dividing line between said two compartments and placing a first portion of the roots into the coarse growing medium and a second portion of the roots into the fine growing medium, introducing water into the coarse growing medium, and transmitting water from the coarse growing medium to the fine growing medium through a wick extending into both of said mediums.

* * * * *